United States Patent [19]

Zeno et al.

[11] Patent Number: 4,463,573
[45] Date of Patent: Aug. 7, 1984

[54] PRESSURE RESPONSIVE SAFETY CONTROL FOR REFRIGERANT COMPRESSOR

[75] Inventors: Robert V. Zeno, Farmington Hills; George A. Lutz, Ann Arbor; Jayendra J. Amin, Canton, all of Mich.

[73] Assignee: Ford Motor Company, Dearborn, Mich.

[21] Appl. No.: 403,442

[22] Filed: Jul. 30, 1982

Related U.S. Application Data

[63] Continuation of Ser. No. 186,946, Sep. 15, 1980, abandoned.

[51] Int. Cl.³ .................. G05D 23/32; F25B 27/00
[52] U.S. Cl. ........................... 62/157; 62/228.3; 62/323.4
[58] Field of Search ............. 62/231, 158, 229, 157, 62/228.3, 228.4, 323.4

[56] References Cited

U.S. PATENT DOCUMENTS 3,298,192  1/1967  Morgan .................... 62/231 X
4,034,570  7/1977  Anderson et al. .......... 62/158

Primary Examiner—Harry Tanner
Attorney, Agent, or Firm—Frank G. McKenzie; Donald G. Harrington

[57] ABSTRACT

A compressor protector system is an air conditioning system that includes a compressor driven by an engine through an electromagnetic clutch. If the refrigerant charge is below the level necessary for proper compressor cooling and lubrication a pressure or temperature responsive switch cycles at an excessive rate. A digital counter adds the number of cycles occuring over a given time, compares the rate of switch pulses to a predetermined maximum and operates to disengage the clutch and signal the vehicle operator that corrective action to restore the refrigerant charge is required.

2 Claims, 1 Drawing Figure

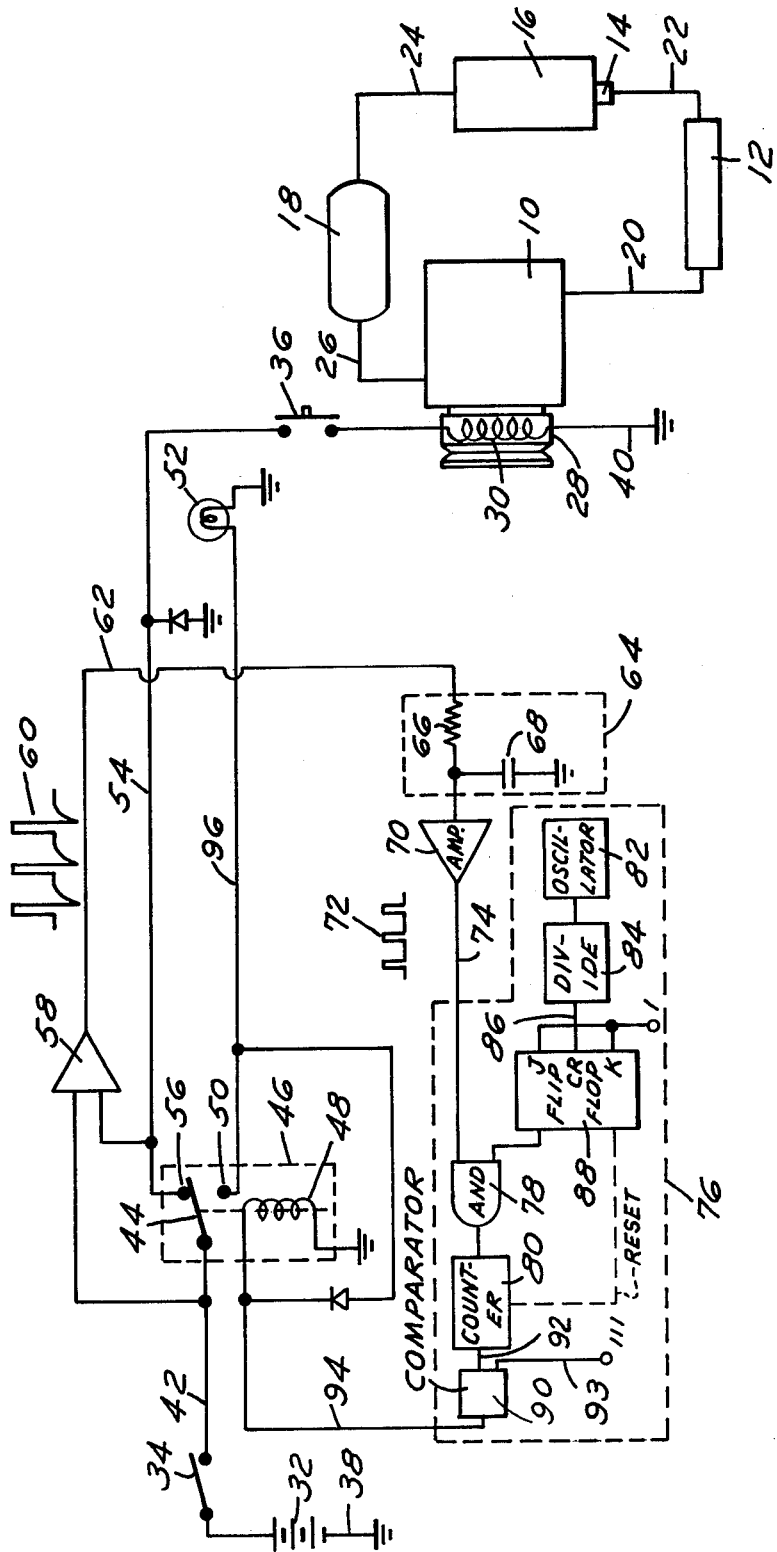

PRESSURE RESPONSIVE SAFETY CONTROL FOR REFRIGERANT COMPRESSOR

This is a continuation of application Ser. No. 186,946 filed Sept. 15, 1980 now abandoned.

BACKGROUND OF THE INVENTION

1. Field of the Invention.

This invention relates to a protective system for a refrigerant compressor. More particularly, the invention pertains to a digital logic circuit that disengages the compressor from the engine of an automobile when the quantity of refrigerant is insufficient.

2. Description of the Prior Art.

Automotive air conditioning systems have oil or other lubricant mixed with the refrigerant that circulates among the condenser, evaporator and compressor. If the refrigerant charge within the air conditioning system decreases, perhaps due to leakage, to an insufficient quantity the passenger compartment may not be adequately cooled and the compressor may be supplied with an insufficient amount of lubricant.

To avoid damage to the compressor resulting from an insufficient supply of lubricant and to avoid the recurring incidence of an inadequately cooled passenger compartment, the air conditioning system of an automobile should have provision for sensing a low charge of refrigerant and means for warning the vehicle operator of this condition. Further, the system should include a device that automatically disengages the driving connection between the engine and the compressor when the low charge condition exists.

Canter, U.S. Pat. No. 3,765,191 discusses a compressor protector which deactivates the compressor when the refrigerant charge level decreases below the quantity needed for cooling and lubrication. The electrical circuit for producing this result includes a heat biased relay, a battery, a fuse and a normally open switch. When the switch closes in response to high refrigerant temperature or low refrigerant pressure, the relay closes a circuit having a short time delay, which causes the fuse to open and deenergize the magnetic clutch. This renders the compressor inoperative until the fuse is replaced and more refrigerant is added to the system.

Basset, U.S. Pat. No. 3,686,892 teaches the use of a resistant wire heater located adjacent a fuse in an electrical circuit that supplies power through a normally open switch to a magnetic clutch that transmits drive from the engine to the compressor. The switch includes a refrigerant-filled bellows that expands in response to a predetermined refrigerant temperature in the compressor inlet to close the switch. When the switch closes, the wire heater is energized and after a time delay the fuse opens to de-energize the magnetic clutch, thus disconnecting the compressor from the engine.

Young, U.S. Pat. No. 3,631,685 includes a temperature responsive switch and a pressure responsive switch in an electrical circuit that operates to supply power to the compressor. If the power supply to the compressor is interrupted, a main switch opens and de-energizes the motor. A solenoid in the circuit is unable to be de-energized to close the main switch until the discharge pressure of the compressor is reduced to a low starting torque value.

The prior art has, therefore, included the use of electrical switches that operate in response to certain parametric variations in the operation of the air conditioning system to disable the compressor from continued operation that may produce damage to the compressor or continuously unsatisfactory cooling. Generally, these devices open the electrical circuit that completes a driving connection between the vehicle engine and the compressor. When the circuit is opened, further reactivation of the compressor is prevented until operation of the system is corrected by the replacement of an electrical component whose failure has indicated the hazardous operating condition. Once the operating parameter of the air conditioning system is recognized as being beyond an acceptable value and likely to cause damage to the compressor, no further operation of the air conditioning system is possible. Therefore, if the transducer or pressure switch is itself defective, replacement must occur before further operation of the system is possible. In the prior art a single malfunction of the pressure switch or a single operation of the transducer that works to sense the operating parameter of interest will completely disable the air conditioning system until the defective component is replaced or the system is recharged with refrigerant.

SUMMARY OF THE INVENTION

According to a first aspect of this invention, a switch responsive to an operating parameter of an air conditioning system, for example, the pressure of the refrigerant, the temperature of the refrigerant or the temperature of the air cooled by the refrigeration system, cycles ON and OFF as the sensed parameter changes magnitude with respect to a critical value that causes the switch to change state. When the magnitude of the sensed parameter exceeds or becomes less than the critical value, the rate at which the electrical switch changes state is sensed by a digital logic control circuit that can operate to prevent further operation of the compressor.

Therefore, an object of this invention is to provide a refrigerant compressor protector that senses an insufficient refrigerant charge for cooling and lubricating and deactivates the compressor to prevent further operation while the charge level is less than a predetermined value. The electrical circuitry according to this invention produces this result upon sensing the frequency at which the electrical switch cycles between its on and off states.

Another object of this invention is to provide logic circuitry responsive to the frequency at which the switch cycles that operates to produce the disabling function when the actual frequency exceeds a frequency that has been predetermined to indicate a requirement for corrective action to prevent damage to the compressor. In accordance with this aspect of the invention the compressor protector includes a current detector adapted to sense current flowing in the electrical circuit that connects a power source to a coil of a magnetic clutch that transmits drive from the engine to the compressor. A zero crossing detector for converting the waveform produced in the current detector to a unidirectional square wave pulse train supplies the pulse train so produced to one input terminal of an AND gate. A crystal oscillator produces a pulse train having a constant frequency. A scale divider may be included to divide the oscillator output by a constant to produce a pulse train having a constant frequency corresponding to the units of a predetermined frequency. A toggle flip-flop is set to the on condition for the period of the output of the scale divider. A second input terminal of the AND gate receives the output from the toggle flip-flop. The gate is therefore open for the period of the flip-flop output pulse train. The number of pulses at the output of the AND gate occuring during the period of the flip-flop pulse train is incremented in a binary counter. A digital or analog comparator is adapted to produce an output signal when the pulse count received from the binary counter attains a predetermined value. The signal from the comparator operates to energize the coil of a relay causing the relay to change state, thereby opening the electrical circuit that supplies power to the magnetic clutch coil. The change of state of the relay operates also to signal the vehicle operator that the compressor has been disengaged and that the need for corrective action is required. Under normal operating conditions when the number of pulses passing through the AND gate during the period of the waveform produced by the toggle flip flop is less than the predetermined number of pulses corresponding to the critical frequency determined to be an acceptable frequency, no output signal is produced by the comparator and the electrical circuit carrying power to the coil of the magnetic clutch is closed.

BRIEF DESCRIPTION OF THE DRAWING

The FIGURE is a schematic diagram of an air conditioning system showing the protective control that interacts with a parameter sensing switch to de-energize the clutch coil when the switch frequency exceeds a predetermined value.

DESCRIPTION OF THE PREFERRED EMBODIMENT

In the drawing, a conventional automobile air conditioning system is shown to include a compressor 10, a condenser 12, an expansion valve 14, an evaporator 16 and a refrigerant accumulator 18. Compressor 10 is connected by high pressure line 20 through which refrigerant flows to the condenser 12. The evaporator 16 and throttling valve 14 receive refrigerant through line 22 from the discharge side of the condenser. Refrigerant flows from the exit side of the evaporator 16 through refrigerant line 24 to accumulator 18, which is connected by line 26 to the inlet side of the compressor 10.

The compressor is driven from the engine (not shown) through an electromagnetic clutch 28 that transmits power to the compressor when the coil 30 is energized. Coil 30 is energized by a battery 32 through an ON/OFF switch 34 and the switch 36. Switch 36 senses pressure or temperature variations within the pressurized portion of the system or within the suction side of the refrigeration circuit, that is, within lines 24, 26 and the accumulator 18. Alternatively, switch 36 can be adapted to sense pressure and temperature of the refrigerant or another parameter indicative of the operation of the refrigeration system or any of its components. Switch 36 can be adapted to sense temperature within the passenger compartment instead of or in addition to sensing pressure or temperature of the refrigerant. The coil 30 and battery 32 are grounded respectively by conductors 38, 40. The on-off switch 34 is manually operated to activate the air conditioning system.

Whenever the refrigerant charge level decreases below the quantity required for cooling and lubricating the compressor, the protective circuitry according to this invention will de-energize the coil 30, thus disconnecting the driving engagement of the compressor from the engine. During normal operation, the liquid refrigerant is vaporized in the evaporator 16 and absorbs heat from the air in the passenger compartment of the vehicle. The low pressure vapor from the evaporator is drawn into the compressor through the suction lines 24, 26 where it is raised in pressure and temperature for delivery to the condenser 12. The refrigerant is compressed sufficiently to have a saturation temperature higher than the temperature of the available cooling medium so that heat can be dissipated in the condenser 12. After heat removal and condensation, the liquid refrigerant passes through the expansion valve 14 where the refrigerant throttles to the evaporator pressure. In passing through the expansion valve the liquid refrigerant cools itself, and evaporates a portion of the liquid.

When the system operates with a low refrigerant charge, rapid cycling of switch 36 and as a consequence of this, coil 30 occurs. Switch 36 is preferably mounted on the suction accumulator 18 so that variations of pressure within the accumulator cause the switch to close when accumulator pressure is above a predetermined value and to open when the pressure in the accumulator is below that critical value. When the system is adequately charged with refrigerant, switch 36 may complete approximately seven cycles of on-off operation per minute. However, if the refrigerant system has an inadequate charge switch 36 will cycle at a faster rate. The protection and control circuitry shown in the figure operates by determining the time rate of switch cycling and comparing this value to a predetermined acceptable rate. When the actual cycle frequency is greater than the standard, d.c. power to the coil 30 is interrupted through operation of a relay and a warning signal is provided the operator.

Battery 32 is connected through the on-off switch 34 by a conductor 42 to the moveable transfer contact 44 of the relay 46. The normal position for transfer contact 44 of the relay is the position shown in the drawing. When the relay coil 48 is energized the transfer toggle moves to engage contact 50 thereby opening the circuit that includes switch 36 and closing the circuit that includes the warning lamp 52.

A conductor 54 connects contact 56 of the relay 46 to switch 36, which opon closing operates to energize coil 30 of the magnetic clutch 28. The parametric variations within the refrigerant system sensed by switch 36 may cause the switch to close thereby actuating the compressor which operates to increase the pressure of the refrigerant and thus to lower the temperature within the passenger compartment. When the sensed parameter of the refrigerant system attains the predetermined value following activation of the compressor, switch 36 opens. Under normal operating conditions switch 36 will cycle approximately seven times per minute. Closure of switch 36 causes a stepwise variation of the voltage across contact 56 from the potential of the battery to approximately minus nine volts. The current detector 58 may comprise a simple resistor shunted across contact 56 of relay 46, across which the voltage waveform 60 may appear as switch 36 is cycled. Following the switching impulse, the voltage across contact 56 returns to zero until switch 36 is opened, which causes a stepwise increase in the voltage to the potential of the battery. The pulse train 60 represents the voltage waveform across the contact 56 resulting from cyclic operation of switch 36. This waveform is transmitted on conductor 62 to the low pass filter 64, which includes series resistor 66 and shunt compacitor 68. The output from the filter 64 is fed to an operational amplifier 70, whose output appears as a unidirectional pulse train 72 carried on conductor 74 to the frequency measuring system 76.

The input signal 72, whose frequency is to be measured, is applied through an AND gate 78 to a digital counter 80. In order to determine the frequency it is required to keep the gate open for a known time interval. If, for example, the gating time is one minute, the counter register will contain the binary number representing the number of pulses 72 occuring during one minute, which is the frequency of the input 72 directly in cycles per minute. The clock 82 for establishing gating interval is an accurate crystal oscillator whose frequency is 1 MHz. The crystal oscillator drives a scale-of-$10^6$ circuit 84, which divides the crystal frequency by a factor of 60 million. Consequently, the divider output is a one cycle per minute signal whose period is as accurately maintained as is the crystal frequency. The divider output signal on conductor 86 controls the gating time by setting a toggle flip-flop 88 to the ON state for one minute. The data input terminals J-K of a flip-flop 88 are continuously held in the ON condition. Therefore, gate 78 admits an output pulse to the counter 80 corresponding to each impulse 72 received at its input terminal during the period of the clock pulse received at the other input terminal of gate 78.

Counter 80 incrementally counts the pulses 72 admitted through gate 78 during the period in which flip-flop 88 produces a positive output signal. A magnitude digital comparator 90 receives through conductor 92 the total binary number of the incremental pulses recorded in the binary counter 80 during the gating interval. Another input terminal 93 of the comparator 90 is continuously supplied with the binary number corresponding to the predetermined critical frequency of the switch 36 expressed in units corresponding to the period of the toggle flip-flop 88 ON condition. When counter register 80 contains a number equal to the critical frequency, comparator 90 produces an output signal that is carried through conductor 94 to the coil 48 of relay 46. This action operates to cause toggle contact 44 to move from contact 56 into engagement with contact 50. The effect of this change is to open the circuit containing pressure switch 36 and to close the circuit containing warning light 52. After this occurence, the inductive coil 30 of the magnetic clutch 28 is de-energized and will remain so for as long as relay coil 48 is energized. A sample and hold circuit may be introduced after comparator 90 and before coil 48 that will maintain coil 48 energized after the first occurence of a pressure switch frequency exceeding the critical value.

Warning lamp 52 may produce a sensible indication on the instrument panel visible to the vehicle operator that will indicate the need for corrective action by way of recharging the refrigerant system sufficiently so that the compressor will be supplied with refrigerant at a rate sufficient to avoid damage resulting from inadequate lubrication.

Under normal operating conditions when the number of pulses passing through the AND gate during the period of the waveform produced by the toggle flip flop is less than the predetermined number of pulses corresponding to the critical frequency determined to be an acceptable frequency, no output signal is produced by the comparator and the electrical circuit carrying power to the coil of the magnetic clutch is closed.

Having described the preferred embodiment of our invention what we claim and desire to secure by U.S. Letters Patent is:

1. In an air conditioning system including a refrigerant compressor driven by an engine, a compressor protector comprising:
   first means for establishing and disestablishing a driving connection between the compressor and the engine according to whether the magnitude of an operating parameter of the system is greater or less than a predetermined value;
   second means responsive to the frequency at which said first means changes state for disestablishing the driving connection between the compressor and the engine when said frequency equals or exceeds a predetermined frequency;
   said second means comprising a current detector for sensing discontinuous current flow in an electrical circuit that supplies power to said first means;
   comparator means for comparing the number of occurrences of current flow in the electrical circuit during a specific period of time to a predetermined number;
   means for disestablishing the driving connection between the compressor and the engine when the number of occurrences of current flow equals or exceeds the predetermined number;
   said comparator means including:
   an oscillator producing a pulsetrain having a constant frequency;
   a flip-flop set to the ON state for the period of the pulsetrain produced by said oscillator;
   an AND gate having one input terminal connected to the output of said current detector and a second input terminal connected to the output of said flip-flop whereby said gate is open for the period of said flip-flop output pulsetrain;
   a counter adapted to incrementally count the number of pulses received from the output of said AND gate during discrete periods when said gate is open;
   a comparator adapted to produce a signal when the pulse count received from said binary counter attains a predetermined value, the signal operating to disestablished the driving connection between the compressor and the engine;
   said current detector further including a zero crossing detector for converting the output waveform of said current detector to an undirectional pulsetrain which is supplied to said AND gate; and a low-pass filter for eliminating noise from the output signal of said current detector, the output signal of said filter being supplied to said zero crossing detector.

2. In an air conditioning system including a refrigerant compressor adapted to be driveably connected to and disconnected from an engine protector comprising:
   an electrical power source;
   a clutch having an induction coil supplied with current from said power source, adapted to produce a driving connection between the engine and compressor;
   a switch for opening and closing an electrical circuit that connects said power source to said clutch coil according to whether the magnitude of at least one operating parameter of the system is greater or less than a predetermined value;

a relay whose normal state closes the electrical circuit that connects said power source to said clutch coil, having a coil that opens the circuit when the coil is energized;

a current detector sensing current in the electrical circuit that connects said power source to said clutch coil;

a low pass filter for eliminating noise from the output of said current detector;

a zero-crossing detector for converting the waveform output from said low pass filter to a square wave pulse train;

an oscillator producing a pulse train having a constant frequency;

a scale divider that divides the oscillator output by a constant to produce a pulse train having a constant frequency corresponding to the units of a predetermined frequency;

a toggle flip-flop set to the ON state for the period of said scale divider output;

an AND gate having one input terminal connected to the output of said zero-crossing detector and a second input terminal connected to the output of said flip-flop whereby said gate is open for the period of said flip-flop output pulse train;

a binary counter adapted to incrementally count the number of pulses received from the output of said AND gate during discrete periods when said gate is open; and a comparator adapted to produce a signal when the pulse count received from said binary counter attains a predetermined value, the signal energizing the coil of said relay thereby disconnecting the driving connection between said compressor and the engine and producing a sensible indication of such disconnection.

* * * * *